Dec. 16, 1947.  G. A. LYON  2,432,530
WHEEL COVER
Filed May 12, 1945
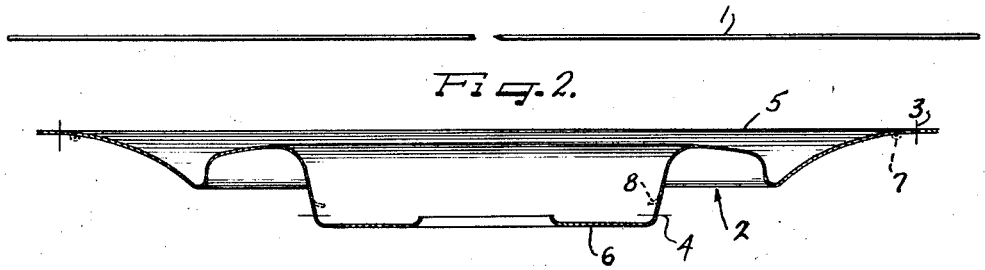
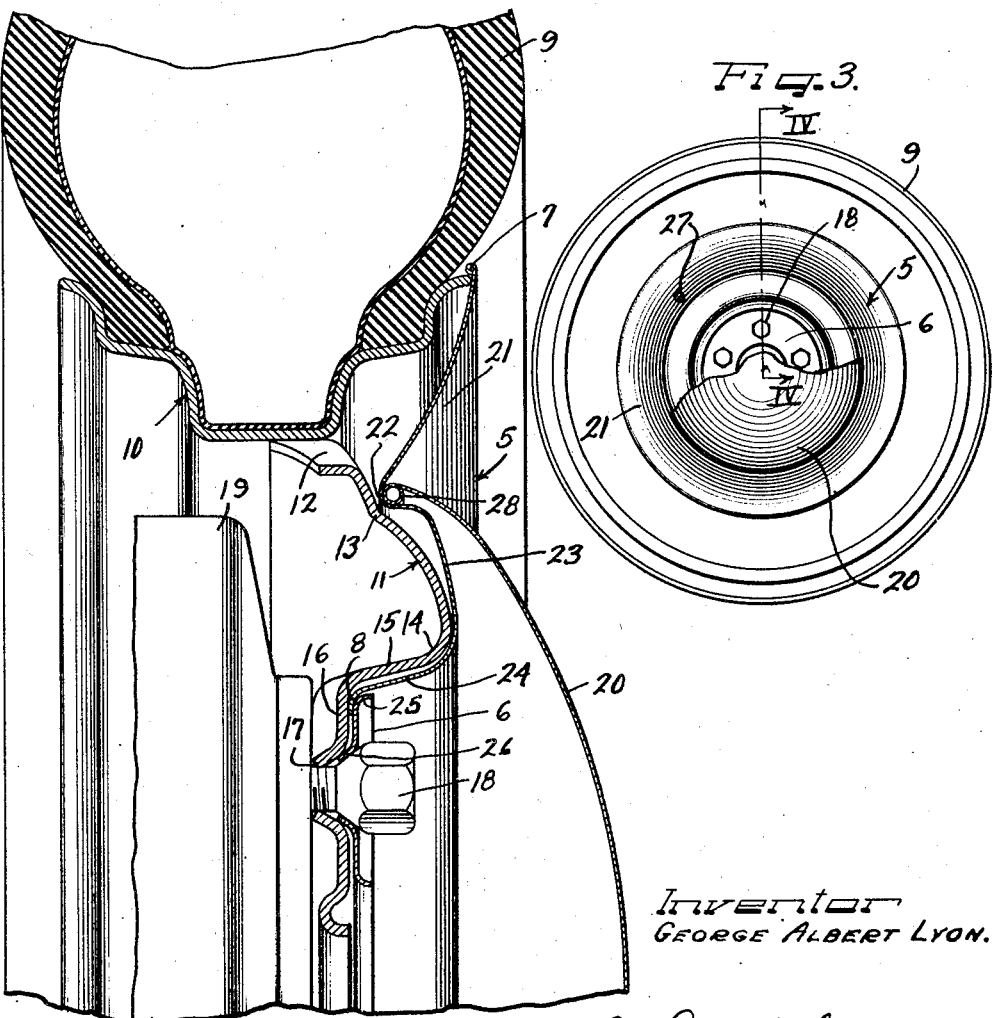
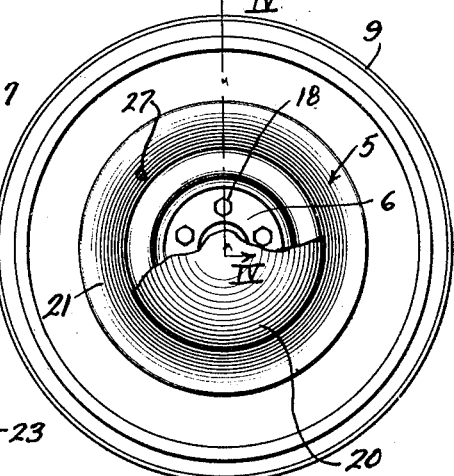
Inventor
GEORGE ALBERT LYON.
by The Firm of Charles W. Hills Attys.

Patented Dec. 16, 1947

2,432,530

UNITED STATES PATENT OFFICE 2,432,530

WHEEL COVER

George Albert Lyon, Allenhurst, N. J.

Application May 12, 1945, Serial No. 593,473

10 Claims. (Cl. 301—37)

This invention relates to a wheel structure and more particularly to a novel multi-part wheel cover assembly as well as to the manufacture of the same.

An object of this invention is to provide an economical form of retaining means for a wheel cover.

Another object of this invention is to provide a multi-part wheel cover assembly which has a highly ornamental appearance and which lends itself to use on an automobile wheel.

A further object of this invention is to provide a retaining means for a wheel cover assembly as well as an economical way of making the same.

In accordance with the general features of this invention there is provided in a cover structure for a wheel including tire rim and body parts the latter of which has a central bolt-on flange and headed fastening elements therefor, a circular cover for the wheel having between its inner and outer margins a bellows-like yieldable flattened portion and a ring engaging the inner margin of the cover to deflect same toward the wheel through the yielding of said flattened portion, said ring being clamped to the wheel by the wheel fastening elements.

Another feature of the invention relates to the construction of the central ring for clamping the cover on the wheel and to the formation of this ring from the central part of the blank from which the cover is made.

Other objects and features of this invention will more fully appear from the following detail description taken in connection with the accompanying drawings which illustrate a single embodiment thereof and in which, Figure 1 is an end view of a blank from which parts of my cover assembly are made;

Figure 2 is a cross-sectional view taken through a stamping pressed from the blank shown in Figure 1;

Figure 3 is a side view of a wheel showing my novel wheel cover assembly applied thereto and showing the hub cap partly broken away to illustrate the fastening of the cover to the wheel; and Figure 4 is an enlarged fragmentary cross-sectional view taken on the line IV—IV of Figure 3 looking in the direction indicated by the arrows.

As shown on the drawings:

The principal parts of my novel cover assembly are adapted to be blanked from a sheet of metal such as the sheet 1 in Figure 1. Any suitable sheet metal may be employed such for example as stainless steel sheet or a good quality of steel sheet.

From this sheet 1 a stamping, such as the stamping 2 shown in Figure 2, may be formed on any suitable press equipment. After the forming of the stamping the outer edge and the corners of the same may be trimmed off along the line 3 and the trimmed edge may be rolled into a bead or turned edge 7 (shown by dotted lines).

The central portion of the stamping may also be cut on the line 4 shown in Figure 2 thus forming the stamping into two cover parts 5 and 6. The inner peripheral edge of the cover part 5 may be slightly turned as indicated by dotted lines at 8.

The outer cover part 5 comprises the main cover of my assembly and the part 6 comprises the retaining ring both of which parts are adapted to be used with a conventional automobile wheel as shown in Figure 4. In this illustration the reference numeral 9 designates generally a conventional pneumatic automobile tire and tube which are mounted in the usual way in the stepped flanges of a multi-flange drop center tire rim 10.

The tire rim 10 is supported upon a load bearing or body part 11 which comprises a dished stamping attached at spaced intervals to the base flange of the tire rim part 10. Between the points of connections of the rim and body parts 10 and 11 are wheel openings 12 which are customarily used to give the body part a spoke-like appearance and also to provide for the circulation of air around the brake drum.

The body part 11 has an annular indentation 13 adjacent the wheel opening 12 in which a portion of the cover 5 is adapted to extend. In addition, the body part 11 has a central nose portion 14 and a rearwardly depressed portion 15 terminating in a bolt-on flange 16. This bolt-on flange has a plurality of bolt openings 17, such for example as five in number, through which bolt or cap screws 18 extend for clamping the wheel to the brake drum 19.

The cover part 5, the retaining ring 6 and a central hub cap part 20 are adapted to be associated with the outer side of the wheel to provide a wheel cover assembly thereon. It will be noted that the cover ring 5 includes a convexly curved radially outer portion 21 which extends radially and axially inwardly from the turned edge 7 to the indentation or groove 13 in the body part. This portion 21 may be given any suitable finish but if it is finished in white it will result in the tire appearing to extend clear down to the body part 11. In other words, due to the curvature of the portion 21 and its juxtaposition to the outer side wall of the tire 9 it in use will, when finished in white, appear to constitute a white side wall part of the tire.

The annular portion 21 terminates in a grooved portion 22 which in turn connects to a substantially flat bellows-like portion 23 which is adapted to yield in the application of the cover to the wheel. This portion 23 in turn terminates in a rearwardly turned portion 24 which telescopes the central recess portion 15 of the body part. The inner turned edge 8, previously referred to in Figure 2 of the cover ring 5, is adapted to seat against the bolt-on flange 16 of the body part and underneath the curled outer edge 25 of the retaining ring 6.

It will be perceived that the retaining ring 6 comprises the part 6 of the stamping shown in Figure 2, but as illustrated in Figure 4, has been subjected to additional operations to provide the turned outer margin 25 and also to provide it with a plurality of bolt receiving holes each of which is defined by a tapered edge 26.

From Figure 3 it will be noted that the portion 21 of the cover may, if it is so desired, be provided with a hole 27 to which the usual valve stem extending from the tire rim may project so as to be accessible without requiring the removal of the cover from the wheel.

In the application of the cover to the wheel the part 5 is first placed over the outer side of the wheel and its opening 27 is brought into register with the valve stem. Thereafter, this part is pressed against the wheel.

Then the central retaining ring 6 is seated over the turned edge 8 of the cover ring 5 and the tapered edges 26 are nested in the tapered holes 17 of the body part. The bolts or cap screws 18 are then threaded into the brake drum through the holes 17 thus clamping the ring 6 tightly against the inner turned edge 8 of the main cover ring 5. During this clamping operation the turned outer edge 7 of the cover is first brought to bear against an outer edge of the tire rim and thereafter the inner portion 24 of the cover is stressed or pulled axially toward the body part into tensioned engagement with the bolt-on flange 16. This deflection of the portion 24 axially rearward is possible by reason of the yielding of the bellows-like flattened portion 23. As a result of this tensioned clamping of the cover to the wheel, the cover is held in a tight-fit at two points with the wheel, namely at the outer edge 7 and at the turned inner edge 8. This is a decided advantage inasmuch as it enables the cover to adjust itself to the parts of the wheel irrespective of allowable manufacturing variations in these parts. Thus the cover part 5 does not have to be initially formed so as to fit exactly the wheel, inasmuch as the clamping of the cover to the wheel will automatically adjust it to the contour of the wheel and to manufacturing variations in the parts thereof.

The final operation in the mounting of the cover assembly on the wheel comprises the snapping of the hub cap 20 into retained cooperation with the cover part 5. It will be noted that the hub cap part 20, which may be made of any suitable steel sheet, has a turned outer edge 28 which is adapted to be sprung into retained engagement with the groove portion 22 of the cover 5.

Removal of the cover part may be effected in the reverse order of that previously described. First, the hub cap is pried free of the wheel cover part by means of a screwdriver or pry-off tool inserted under the hub cap edge 28. Thereafter the wheel bolts 18 are unscrewed from the brake drum 9 which then makes possible the lifting of the ring 6 and the cover ring 5 off of the wheel.

It will, of course, be understood that various details of construction may be varied through a wide range without departing from the principles of this invention, and it is therefore not the purpose to limit the patent granted hereon otherwise than necessitated by the scope of the appended claims.

I claim as my invention:

1. In a cover structure for a wheel including tire rim and body parts the latter of which has a central bolt-on flange and headed fastening elements therefor, a circular cover for said wheel having between its inner and outer margins a bellows-like yieldable flattened portion, said outer margin being engageable with one of the wheel parts, and a ring for engaging the inner margin of said cover to deflect same toward the wheel through the yielding of said flattened portion after engagement by said outer margin of the wheel part, said ring being adapted to be clamped to the wheel by the wheel fastening elements.

2. In a cover structure for a wheel including tire rim and body parts the latter of which has a central bolt-on flange and headed fastening elements therefor, a circular cover for said wheel having between its inner and outer margins a bellows-like yieldable flattened portion, said outer margin being engageable with one of the wheel parts, and a ring for engaging the inner margin of said cover to deflect same toward the wheel through the yielding of said flattened portion after engagement by said outer margin of said wheel part, said ring being adapted to be clamped to the wheel by the wheel fastening elements, said cover having radially outwardly of said flattened portion a groove portion for retainingly receiving the outer edge of a hub cap to hold the same on the cover.

3. In a cover structure for a wheel including tire rim and body parts the latter of which has a central bolt-on flange and headed fastening elements therefor, a circular cover for said wheel having between its inner and outer margins a bellows-like yieldable flattened portion, said outer margin being engageable with one of the wheel parts, and a retaining ring for engaging the inner margin of said cover to deflect same toward the wheel through the yielding of said flattened portion after engagement of said wheel part by said outer margin, said ring being adapted to be clamped to the wheel by the wheel fastening elements, said retaining ring having tapered apertured portions for telescoping the holes in the bolt-on flange and which are adapted to be engaged by slanting surfaces on the heads of the fastening elements.

4. In a cover structure for a wheel including tire rim and body parts the latter of which has a central bolt-on flange and headed fastening elements therefor, a circular cover for said wheel having between its inner and outer margins a bellows-like yieldable flattened portion and a ring engaging the inner margin of said cover to deflect same toward the wheel through the yielding of said flattened portion upon engagement of the outer margin with one of the wheel parts, said ring being adapted to be clamped to the wheel by the wheel fastening elements, said cover having an annular outer portion radially beyond said flattened portion which is adapted to extend radially and axially rearwardly from an outer edge of the tire rim into an indentation in the body part adjacent the flattened portion of the cover.

5. In a wheel structure including a tire rim and a body part having a central bolt-on flange and headed fastening elements associated therewith, a circular wheel cover having between its inner and outer margins a bellows-like yieldable portion, the outer margin of the cover being engageable with the tire rim, and a retaining ring engaging the inner margin of the cover, said ring being engaged by the fastening elements and clamped thereby against said inner margin and said inner margin in turn deflected toward the bolt-on flange through the yielding of said bellows-like portion and secured in place.

6. A wheel structure including tire rim and body parts the latter of which has an annular axially outwardly protruding nose portion and a central bolt-on flange for reception of headed fastening elements, a circular wheel cover having between its inner and outer margins a bellows-like yieldable portion offset axially outwardly to clear said protruding nose portion, an outer margin on said cover engageable with the tire rim, an inner margin engageable with said bolt-on flange, said bellows-like portion and said inner margin normally tending to draw away from the wheel when the outer margin is in contact with the tire rim, a retaining ring engaging said inner margin and constructed and arranged to be engaged by the fastening elements and clamped against the bolt-on flange and by deflection of said bellows-like portion toward the wheel clamping said inner margin to the bolt-on flange whereby to secure the cover in place on the wheel.

7. In a cover structure for a wheel including a tire rim and a body part having a central flange with bolt-on means, a wheel cover of sheet metal for said wheel including an outer annular portion for disposition over the exposed outer side flanges of the rim, an intermediate axially offset annular portion for disposition opposite the body part and a radially inner portion adapted to extend in close proximity to said bolt-on means and attachment ring means adapted to be engaged by said bolt-on means and to cooperate in overlapping relation with the inner edge of said inner cover portion to clamp said cover under tension to the wheel, the cover structure being engageable with the wheel radially outwardly of said inner portion in the initial assembly of the cover with the wheel.

8. In a cover structure for a wheel including a tire rim and a body part having a central flange with bolt-on means, a wheel cover of sheet metal for said wheel including an outer annular portion for disposition over the exposed outer side flanges of the rim, an intermediate axially offset annular portion for disposition opposite the body part and a radially inner portion arranged to extend in close proximity to said bolt-on means, attachment ring means arranged to be engaged by said bolt-on means and constructed for overlapping the inner edge of said inner cover portion to clamp said cover under tension to the wheel, said intermediate portion comprising a flexible diaphragm yieldable upon pressure by said ring means on said inner portion whereby the cover can be drawn tightly against the wheel, the cover structure being engageable with the wheel radially outwardly of said diaphragm in the initial assembly of the cover with the wheel.

9. In a cover structure for a wheel including a tire rim and a body part having a central flange with bolt-on means, a wheel cover of sheet metal for said wheel including an outer annular portion for disposition over the exposed outer side flanges of the rim and a radially inner portion disposed to extend in close proximity to said bolt-on means, and an attachment ring to be engaged by said bolt-on means and to be located for overlapping the inner edge of said inner cover portion to clamp said cover under tension to the wheel, the cover structure being engageable with the wheel radially outwardly of said inner portion in the initial assembly of the cover with the wheel, said attachment ring having an inclined axially rearward portion engageable under the bolt-on means and with the central flange of the wheel.

10. In a cover structure for a wheel including a tire rim and a body part having a central flange with bolt-on means, a wheel cover of sheet metal for said wheel including an outer annular portion for disposition over the exposed outer side flanges of the rim, an intermediate axially offset annular portion for disposition opposite the body part and a radially inner portion to extend in close proximity to said bolt-on means, the cover structure being engageable with the wheel radially outwardly of said inner portion in the initial assembly of the cover with the wheel, an attachment ring engageable by said bolt-on means and constructed for overlapping the inner edge of said inner cover portion to clamp said cover under tension to the wheel, said offset intermediate portion having hub cap retaining means thereon, and a hub cap retained on the cover by said retaining means.

GEORGE ALBERT LYON.

REFERENCES CITED

The following references are of record in the file of this patent:

UNITED STATES PATENTS

| Number | Name | Date |
|---|---|---|
| 2,166,216 | Lyon | July 18, 1939 |
| 2,197,608 | Burger | Apr. 16, 1940 |

FOREIGN PATENTS

| Number | Country | Date |
|---|---|---|
| 263,882 | Great Britain | Apr. 21, 1927 |